United States Patent Office 2,773,050
Patented Dec. 4, 1956

2,773,050

WATER VAPOR PERMEABLE COMPOSITIONS AND ARTICLES CONTAINING A POLYACRYLIC ESTER AND POLYVINYL ALCOHOL

John R. Caldwell and Russell Gilkey, Kingsport, Tenn., assignors to Eastman Kodak Company, Rochester, N. Y., a corporation of New Jersey No Drawing. Application April 30, 1952,
Serial No. 285,316

13 Claims. (Cl. 260—45.5)

This invention relates to the preparation of synthetic resinous compositions prepared by polymerizing an acrylic ester while in admixture with a polymer containing hydroxyl radicals, e. g., polyvinyl alcohol; such resinous compositions can then be hardened by treatment with a cross-linking agent. This invention also relates to the preparation of films, fibers, and coating compositions containing such synthetic resinous compositions particularly when hardened. This invention also relates to the preparation of textile fabrics and leather coated with such synthetic resinous compositions, especially when hardened.

U. S. 2,169,250, dated August 15, 1939, discloses the formation of films, fibers, etc., from a synthetic resinous composition prepared by forming a solution comprising polyvinyl alcohol and a compound capable of forming a cross-linked structure with polyvinyl alcohol, after which the solution is formed into film, fibers, or the like and then such formed products are converted into products which are insoluble in water and all common solvents. The compounds of this patent which are capable of forming a cross-linked structure include polycarboxylic acids, aldehydes, polyhalogenated compounds, acid chlorides, chlorinated ethers, etc. Among the polycarboxylic acids mentioned is polymerized acrylic acid as well as its homologs. It is indicated that the acrylic acid and its homologs can be polymerized in admixture with polyvinyl alcohol by the use of heat and/or a polymerization catalyst, following which the desired film, fiber or other product is shaped and then heated, thus causing the shaped product to assume an insoluble cross-linked structure between the polyvinyl alcohol and the polyacrylic acid molecules. According to the sole example having any possible pertinence to the instant invention, a methacrylic acid polymer is formed in the presence of a polyvinyl alcohol polymer and then the two polymers are inter-reacted to produce an insoluble ester of the polyvinyl alcohol as shown by the following schematic arrangement:

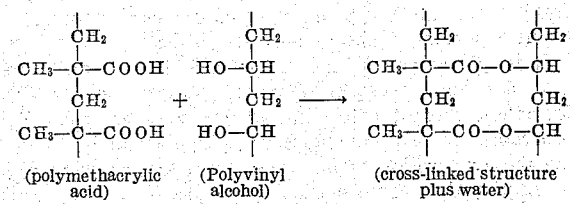

(polymethacrylic acid)  (Polyvinyl alcohol)  (cross-linked structure plus water)

The process of the instant invention is fundamentally different from the process of this Patent 2,169,250 inasmuch as the instant invention employs acrylic acid and its homologs in their completely esterified form. Since no free carboxyl groups are present, the polyacrylate which is formed cannot function as a cross-linking agent and in order to insolubilize the polyvinyl alcohol portion of the resulting product, it is necessary to add another component to the system as a hardening agent, e. g., formaldehyde, urea resins, etc. The product of the instant invention differs from that of the prior art patent in another very important respect. The cross-linked polyvinyl alcohol obtained by the process of U. S. 2,169,250 gives hard, brittle films when the aqueous solution is evaporated. The films can be elongated only a few percent and have practically no flexibility. In contrast to this, the films obtained by the process described in the instant invention are soft and flexible. They can be stretched 25–50 percent and will return to their original dimensions. Furthermore, they remain transparent during the stretching or flexing process. These properties are very important when the products are used as waterproof coatings on cloth or leather. Moreover, products can be obtained according to the instant invention that will transmit water vapor, but will not allow the passage of liquid water. "Breather" fabrics can thereby be obtained that are useful in rain-wear and other outdoor clothing.

Thus, it has been found that a synthetic resinous composition having unexpectedly valuable properties can be prepared by a process comprising polymerizing at an elevated temperature in the presence of a water-soluble peroxy-type catalyst from about 25 to about 80 parts by weight of an acrylic ester having the formula

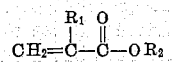

wherein $R_1$ represents a substituent selected from those consisting of a hydrogen atom and a lower alkyl radical containing from 1 to 4 carbon atoms and $R_2$ represents an alkyl radical containing from 1 to 6 carbon atoms while in admixture with from about 75 to about 20 parts by weight of a vinyl polymer having hydroxy radicals which can be depicted as follows:

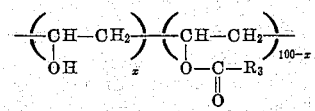

wherein $R_3$ represents a lower alkyl radical, $x$ represents the percentage of this polymer having groups based on vinyl alcohol and $100-x$ represents the percentage based on a lower alkanoic acid ester of vinyl alcohol, the numerical value of $x$ being from about 80 to 100. The resultant synthetic resinous composition is a smooth emulsion or cream. It is ready for use at this stage and can be coated, extruded, or used for dipping, as desired. Thus, a useful product can be obtained merely by evaporating the water from the emulsion to form clear, flexible, tough products such as film, fibers, etc.

It has been further found that films, fibers, etc., can be produced that are resistant to immersion in water by employing a cross-linking agent for the polyvinyl alcohol content of the synthetic resinous composition just described. In general, any of the known hardening agents can be employed, e. g., aldehydes, aliphatic and aromatic polycarboxylic acids, acid chlorides thereof, zirconium salts, trimethylol nitro methane, methylol ureas, methylol melamines, etc. It has been found that the addition of such hardening agents or cross-linking agents to the synthetic resinous composition while in the form of an emulsion or dispersion results in the formation of an improved synthetic resinous composition which can be employed to obtain films, fibers, coating materials, etc. that are resistant to water and many other solvents.

It is an object of this invention to provide a method for preparing synthetic resinous compositions comprising polyacrylates in admixture with polyvinyl alcohol. Another object of this invention is to provide films, fibers, rods, sheets, coating materials, etc. made from compositions comprising polyacrylates in combination with polyvinyl alcohol. A further object of this invention is to provide transparent, flexible sheets and films that have a high capacity to transmit water vapor and are valuable as leather substitutes. A still further object of this invention is to provide a new textile material for the manufacture of raincoats, rain suits, and other types of wet weather clothing. Another object of this invention is to furnish a coated textile fabric that has a high transmission rate for water vapor but will not allow the penetration of liquid water to any significant extent. A further object of this invention is to provide a textile product that resembles natural leather and which may be used for the manufacture of boots and shoes. An additional object of this invention is to furnish an improved leather that is especially suitable for the manufacture of waterproof boots and shoes. Another object of this invention is to provide coated or impregnated leather that has a high transmission rate for water vapor and at the same time a high resistance to penetration by liquid water. An additional object of this invention is to provide a permanent waterproof treatment for leather. Still further objects of this invention will become apparent hereinafter.

In accordance with the process of this invention, a method is provided for preparing synthetic resinous compositions as described in general hereinabove. Advantageously, the polymerization of the described acrylic esters is conducted in the presence of an aqueous solution containing a water-soluble, peroxy-type catalyst and the vinyl polymer having at least 80% of the weight thereof composed of groups based on vinyl alcohol. The temperature of polymerization is advantageously from 45° to about 120° C.; however, it is generally most advantageous to employ a temperature in the range of from about 50° to about 70° C.

The proportion in the synthetic resinous composition of vinyl polymer having hydroxyl radicals which can be employed can advantageously be varied from about 20 percent to about 75 percent by weight; however, it is preferable to employ from about 30 percent to about 60 percent thereof. When the vinyl polymer employed contains an appreciable quantity of vinyl ester, it is advantageous to employ proportionately more than 20 percent of this vinyl polymer. The vinyl polymer having hydroxyl radicals which is employed is water-soluble; advantageously it has a molecular weight in excess of about 10,000. The vinyl ester content of this vinyl polymer is advantageously less than about 20 percent by weight of the polymer.

The polymerization is advantageously carried out by preparing a dispersion of the acrylic ester suspended in an aqueous solution of the vinyl polymer having hydroxyl radicals. This solution advantageously contains from about 0.05 percent to about 3.0 percent of the water-soluble peroxy-type catalyst based on the weight of the acrylic ester. Higher or lower proportions can also be employed. The aqueous dispersion is advantageously well agitated. In preparing the aqueous dispersion, the vinyl polymer is advantageously dissolved in water to give a solution of from about 5 to about 30 percent concentration. The acrylic ester is then advantageously added. It is advantageous to then add an emulsifying agent; however, the addition of such an agent is not necessary. If an emulsifying agent is employed, examples include the alkali metal salts (e. g., the sodium salts) of sulfated fatty alcohols, e. g., sodium dodecyl sulfate, sodium octadecyl sulfate, etc., aromatic sulfonates, soaps, etc.

The water-soluble peroxy-type catalysts which can advantageously be employed include hydrogen peroxide, peracetic acid, alkali metal and alkaline earth metal peroxides, and ammonium and alkali metal perborates, percarbonates, perphosphates, and persulfates, e. g., sodium persulfate, potassium persulfate, hydrogen peroxide, etc. From about 0.05 percent to about 3.0 percent of such catalysts can be advantageously employed; however, it is generally most advantageous to employ from 0.5 percent to 1 percent based on the weight of the acrylic ester employed.

The acrylic esters employed in the process of this invention are derived from straight and branched chain alcohols containing from 1 to 6 carbon atoms. Suitable esters are those derived from the following exemplary alcohols: methyl, ethyl, propyl, n-butyl, isobutyl, sec-butyl, n-amyl, isoamyl, cyclohexyl, etc. Interpolymers of acrylic esters or mixtures of acrylic esters with other ethylenically unsaturated monomers containing no free carboxy radicals, e. g., interpolymers of ethyl methacrylate, methyl ethacrylate, etc., with vinyl acetate, vinyl chloride, acrylonitrile, methacrylonitrile, styrene, etc., can also be employed provided that the interpolymer contains at least 50 mole percent of the acrylic ester.

When the process of this invention is employed maintaining a temperature range from about 50 to about 70° C. with agitation, a period of from about 3 to about 12 hours can be advantageously employed. The final product is a smooth emulsion or cream which is somewhat viscous and contains no lumps or irregularities. It is ready for use at this stage and can be coated, extruded, used for dipping, etc., as desired. Evaporation of water from the emulsion leaves a clear, flexible, tough product.

Generally, it is advantageous to harden the polyvinyl alcohol constituent of this synthetic resinous composition when formed into products suitable for many purposes. Such hardening is accomplished by means of a hardening or cross-linking agent for the polyvinyl alcohol. In general, any of the known hardening or cross-linking agents can be employed advantageously. Examples of such cross-linking agents include the aliphatic and aromatic polycarboxylic acids containing from 2 to 12 carbon atoms, e. g. oxalic acid, sebacic acid, succinic acid, maleic acid, tartaric acid, malic acid, suberic acid, phthalic acid, terephthalic acid, etc., aldehydes containing from 1 to 8 carbon atoms, e. g. succinaldehyde, formaldehyde, etc., 2,3-dihalogenated-1,4-dioxane, alpha, alpha-dihalogenated aliphatic ethers, e. g. alpha, alpha-dichlorodiethyl ether, acid chlorides of aliphatic and aromatic polycarboxylic acids containing from 2 to 12 carbon atoms, e. g., those corresponding to the acids mentioned above, trimethylol nitromethane, methylol derivatives of melamine, urea-formaldehyde resins, zirconium salts and other equivalent metal salts known to be cross-linking agents, etc. In addition to zirconium salts, other inorganic compounds can also be advantageously employed separately or in conjunction with the cross-linking agents mentioned above, e. g., diammonium phosphate, ammonium bichromate, phosphoric acid, etc. Generally, it is advantageous to employ from about 1 to about 10 percent of such cross-linking agents based on the weight of the polyvinyl alcohol present in the synthetic resinous composition to be hardened. It is generally most advantageous to employ from about 2 to about 5 percent of the cross-linking agent.

It is advantageous to add the cross-linking agent to the emulsion or cream described above prior to the formation thereof into film, fibers, coatings, etc. By proceeding in this manner, the employment of heat during the evaporation of the water from the emulsion can be employed to cause hardening to take place and bring about the formation of clear, flexible, tough products. Fibers can be advantageously spun from the such emulsions or dispersions by extrusion through a multi-hole spinnerette into a coagulating bath of a metal salt such as sodium sulfate or other known coagulating agent. Alternatively, a dry spinning process can be advantageously employed wherein the emulsion or dope can be extruded downward through a spinnerette into a heated atmosphere that evaporates the water.

The methods for the formation of films and coatings are obvious to those skilled in the art and comprise essentially coating the emulsion upon a suitable surface followed by evaporating the water therefrom. By selection of a proper surface the film which is formed can be separated from the surface whereby a separate film or sheet is produced. The special properties of the films or sheets obtained by this invention make them valuable for the following uses: substitutes for leather and shoe uppers, clothing that is resistant to toxic gases, and other purposes where the transmission of water vapor is desired. The products of this invention can also be advantageously converted by well known methods into strong elastic fibers that show a high capacity for moisture and dye absorption. The synthetic resinous compositions can also be advantageously employed in the formulation of water-base paints.

An important feature of the new products described in this invention is their property of retaining a high degree of flexibility under all conditions of use and at the same time retaining the property of transmitting water vapor. It is well known in the art that it is very difficult to obtain these two properties in a single material. For example, it is known that films of polyvinyl alcohol can be plasticized to give flexibility and cross-linked to give water insolubility. Such films transmit water vapor. However, when they come in contact with liquid water or aqueous emulsions, the plasticizer is leached from the film and a brittle, inflexible product is obtained when the film is dried. In contrast to this, the present invention provides a film containing polyvinyl alcohol that remains flexible even after prolonged contact with hot water. The polyacrylate resin functions as a permanent water-insoluble plasticizer under all conditions of ordinary use.

The following examples will serve to further illustrate this invention:

EXAMPLE 1 (UNHARDENED FILM)

One hundred grams of methyl acrylate, 50 grams of polyvinyl alcohol and 1.0 gram of potassium persulfate were agitated with 400 cc. of water for 6 hours at 50° C. A viscous emulsion was obtained. This emulsion was coated on a glass plate and dried at 60 to 70° C. to give a clear, tough, flexible film.

EXAMPLE 2 (HARDENED FILM)

In order to obtain a film that is resistant to water it is necessary to add a hardening or cross-linking agent. One hundred grams of the emulsion from Example 1 was stirred with 0.5 gram of trimethylol nitromethane and then coated on plates. After drying at 60° C., the films were heated 30 minutes at 110 to 120° C. Clear, flexible films were obtained that retained their shape and flexibility after 30 minutes in boiling water. These films showed a high capacity for transmitting water vapor.

EXAMPLE 3 (HARDENED FILM)

Sixty grams of polyvinyl alcohol were dissolved in 500 cc. water. Forty grams of butyl acrylate, 0.6 gram of sodium dodecyl sulfate, and 0.4 gram of potassium persulfate were added. The mixture was agitated at 70° C. for 12 hours to give a viscous emulsion. Evaporation of the emulsion produced a tough, flexible film that showed a high transmission for water vapor.

EXAMPLE 4 (HARDENED FIBERS)

Fifty grams of polyvinyl alcohol was dissolved in 400 cc. water. Fifty grams of vinyl acetate, 100 grams of methyl acrylate, 3.0 grams of sodium octadecyl sulfate, and 1.0 gram of potassium persulfate were added. The mixture was stirred at 60° C. for 8 hours to give a highly viscous emulsion. As a hardening agent for the polyvinyl alcohol content thereof, 5 grams of dimethylol urea and 0.5 g. diammonium phosphate were added. The dope was extruded downward through a multi-hole spinneret into a hot air cabinet maintained at 140 to 150° C. The filaments were collected on a spool at the bottom of the cabinet. The yarn was then heated at 110 to 120° C. for 30 minutes to insolubilize the polyvinyl alcohol content thereof. Strong, elastic fibers were produced that retained their shape in boiling water. They had a strong affinity for direct cotton dyes, vat dyes, and cellulose acetate dyes.

EXAMPLE 5 (WATER-BASE PAINT)

Twenty grams of polyvinyl alcohol was dissolved in 300 cc. water. Sixty grams of methyl acrylate, 20 grams of butyl acrylate, 1.0 gram of sodium dodecyl sulfate, and 1.0 gram of potassium persulfate were added. The mixture was stirred at 65° C. for 5 hours to give a viscous, creamy emulsion. Two grams trimethylol melamine and 0.3 gram of phosphoric acid were added to harden the polyvinyl alcohol content thereof. Fifteen parts titanium dioxide pigment was added based on 100 parts of the preceding composition. This composition was useful as a water-base wall paint. It dried in air to give smooth, tough coatings that could be washed with soap and water. This product is also useful as a dipping lacquer.

Fabric treatment

In accordance with one aspect of this invention, the emulsions obtained as described above can be coated upon a large variety of textile fabrics followed by the evaporation of the water to form coated fabrics which retain most of their original porosity with respect to water vapor but become very resistant to the passage of liquid water. In some cases, the treated fabrics will hold a hydrostatic head of 6 feet of liquid water without leaking. It is apparent that such fabrics are of considerable value for the manufacture of raincoats and other types of wet-weather apparel. The garments will allow the escape of moisture from the body, but at the same time will shed water under all conditions of general use. Such coated fabrics can also be advantageously employed for the manufacture of tents and similar articles.

New and valuable textile products closely resembling natural leather in many properties can be made by the process of this aspect of the invention. In accordance with this aspect of the invention, fabrics are impregnated or coated on both sides with the synthetic resinous compositions as emulsions as described above. Upon evaporation of the water, the resulting structure is a coated or impregnated fabric which is soft and flexible yet will hold its shape under severe conditions of wear. Since the water vapor transmission rate is high, and the permeability for liquid water is zero, the products are particularly valuable for the manufacture of boots and shoes. Water-proof products are obtained without the use of oil or grease applications and the ability to shed water is retained permanently.

It is well known that vinyl polymers such as polyethylene, polyalkyl acrylates, polyvinyl chloride, polyvinylidene chloride, polyvinyl acetate, etc., give films that are very impermeable to water vapor. In fact, such films are usually employed as protective coverings for the purpose of excluding water vapor. Garments made from materials of this type have a serious disadvantage. Since moisture vapor cannot escape from the body, the garments become uncomfortable after a relatively short time.

A coated fabric capable of transmitting water vapor but not liquid water is described in British Patent No. 649,094 to Wingfoot. A mixture of rubber and a hydrophilic pigment is employed as the coating layer. A similar product is discussed in Textile Research Journal, 20, 123–132 (1950). The coating has a microporous structure that permits the passage of water vapor. This coating is relatively weak and shows poor abrasion resistance, Furthermore, since it is principally rubber, it is attacked by a wide variety of organic solvent, especially those used in dry-cleaning.

The treated fabrics of the present aspect of this invention depends upon a new principle. The fabric is impregnated or coated with a synthetic resinous composition in the form of an aqueous emulsion or dispersion comprising an alkyl acrylate polymer and polyvinyl alcohol. Such coated fabrics have the property that water vapor is transmitted through the polyvinyl alcohol phase. Penetration by liquid water is prevented by the acrylate polymer. The coatings show excellent resistance to most organic solvents, including those used in dry-cleaning.

The emulsions used in the process of the invention can be advantageously made by the method described hereinabove. Various mixtures of the acrylic esters can be used, depending upon the type of product desired. Interpolymers of acrylates with other vinyl monomers can also be employed as described above.

In order to obtain resistance to organic solvents, it is advantageous to cross-link the acrylic ester polymer in addition to the vinyl alcohol constituent of the synthetic resinous composition. The cross-linking of the acrylic ester polymer constituent can be advantageously accomplished during polymerization by adding 0.5 to 5 percent (higher or lower percentages can also be employed) and preferably 1.0 to 3.0 percent of a divinyl compound such as divinyl benzene, allyl acrylate, allyl phthalate diester, allyl adipate diester, etc. Alternatively, the acrylate polymer constituent can be advantageously cross-linked by adding about 2 to 5 percent beta-chloroethyl vinyl ether or other equivalent suitable halogen compound to the monomer mixture. Zinc oxide, lead oxide, or an equivalent compound can then be advantageously added to the final product and cross-linking accomplished by heating.

In order to obtain resistance to swelling by water, the polyvinyl alcohol portion of the film can be advantageously cross-linked by any of the usual agents, e. g., formaldehyde, urea-formaldehyde resins, oxalic acid, ammonium bichromate, etc., as described hereinabove.

The ratio by weight of acrylate resin to polyvinyl alcohol constituent can advantageously be from about 80:20 to about 50:50; however, it is most advantageous to employ ratios from about 80:20 to about 65:35.

The emulsions obtained in the polymerization process can be advantageously coated on textile fabrics by the usual methods, e. g., by employing rolls and doctor blades. For a fabric suitable for use in making raincoats, from about 10 to about 50 percent and preferably from 20 to 30 percent by weight of the synthetic resinous compositions just described can be advantageously added to the fabric, on a dry weight basis. Higher and lower percentages can also be employed. The coated fabric can then be advantageously dried at from about 100–120° C.; however, higher or lower temperatures can also be employed. When a leather-like product is desired, a relatively high ratio of resin to fabric can be advantageously used. For example, from 100 percent to 400 percent of these synthetic resinous compositions can be advantageously employed, based on the weight of the fabric on a dry weight basis.

Fire-retarding agents such as tricresyl phosphate, triphenyl phosphate, chloroethyl phosphate, etc. can be incorporated in the resin coating film if desired. The fabric can be treated with fire-retarding agents such as borates, antimony salts, tin salts, etc.

Fabrics made from fibers of cotton, silk, viscose, cellulose esters (e. g. cellulose acetate), cellulose ethers, superpolyamides (e. g. nylon), glass, asbestos, flax, hemp, wool, polyesters, etc., can be employed in the preparation of coated or impregnated fabrics in accordance with the above process.

The following examples will serve to further illustrate this aspect of the invention:

EXAMPLE 6 (COATED CELLULOSE ACETATE FABRIC)

Twenty grams of polyvinyl alcohol was dissolved in 200 cc. of water and the following materials were added: 60.0 grams of methyl acrylate, 1.0 gram of allyl phthalate, 1.0 grams of sodium dodecyl sulfate and 0.6 gram of potassium persulfate. The mixture was stirred at 50–60° C. for 8 hours. A viscous, opaque emulsion was obtained. Two grams of trimethylol melamine and 0.2 gram of diammonium hydrogen phosphate were added to cross-link the polyvinyl alcohol constituent of this synthetic resinous composition. To determine its film-forming properties a sample of the emulsion was coated on a glass plate and heated at 100–110° C. to evaporate the water; a clear, tough, rubbery film was deposited which was not soluble in water, acetone, or naphtha. Cellulose acetate taffeta fabric was padded with the emulsion in sufficient quantity to cause an increase in the weight of the fabric of 20–25 percent, on a dry basis. The coated fabric was then dried at 110–120° C. Tests made on the coated fabric showed that it transmitted 70–80 percent as much water vapor as the uncoated fabric. It held a hydrostatic head of 4 to 5 feet of water without seepage. This fabric is valuable for the manufacture of raincoats and rainsuits.

EXAMPLE 7 (COATED NYLON FABRIC)

Twenty grams of polyvinyl alcohol was dissolved in 200 cc. of water and the following materials were added: 30.0 grams of ethyl acrylate, 15.0 grams of vinyl acetate, 1.0 gram of allyl adipate, 0.8 gram of ammonium persulfate and 1.0 gram of sodium octadecyl sulfate. The mixture was stirred at 50–60° C. for 12 hours. A viscous emulsion was obtained. Three cc. of 40 percent aqueous formaldehyde solution and 0.2 g. ammonium chloride was then added to the emulsion. Nylon sharkskin fabric was then padded with the emulsion to give an increase in weight of 15–20 percent, on a dry basis. After drying at 100° C. the fabric was heated at 120° C. for 10 minutes. The coated fabric showed a water vapor transmission of 60–70 percent of the untreated fabric. It held a hydrostatic head of 6 feet of water.

EXAMPLE 8 (IMPREGNATED COTTON FABRIC)

Twenty grams of polyvinyl alcohol was dissolved in 200 cc. of water and the following materials were added: 60.0 grams of methyl acrylate, 20.0 grams of n-butyl acrylate, 1.5 grams of allyl acrylate, 1.2 grams of sodium persulfate and 1.5 grams of sodium oleyl sulfate. The mixture was stirred at 50–60° for 6 hours to give an opaque, viscous emulsion. One gram of dimethylol urea and 0.2 gram of ammonium chloride were added to the emulsion. Six-ounce cotton drill was impregnated with the emulsion to give an increase in weight of 150–200 percent. The fabric was heated at 100° C. until dry, then at 120° C. for 10 minutes. The product was tough and leathery. It showed a water vapor transmission rate of 50–60 percent of the untreated fabric. The product was useful for the manufacture of water-proof boots and shoes because it allowed moisture from the body to escape at a practical rate but was resistant to penetration by liquid water.

EXAMPLE 9 (COATED COTTON FABRIC)

One hundred grams of polyvinyl alcohol was dissolved in 1000 cc. of water. One hundred and fifty grams of ethyl acrylate, 3.0 grams of sodium dodecyl sulfate, and 1.2 grams of ammonium persulfate were added. The mixture was agitated at 60 to 65° C. for 8 hours. A smooth, viscous emulsion was obtained. Three g. oxalic acid was added to the emulsion as a curing agent for the polyvinyl alcohol content thereof. The emulsion was coated on cotton scrim and the coated fabric heated at 100 to 110° C. for 1 hour. A clear, flexible, tough product was obtained. This fabric showed a high capacity to transmit water vapor but was resistant to the passage of toxic gases.

Leather treatment

According to a third aspect of this invention, leather products can be advantageously prepared by coating or impregnating leather with the aqueous emulsions of the synthetic resinous compositions described hereinabove. As pointed out above, films obtained by evaporating the water from such emulsions are permeable to water vapor but are impermeable to liquid water. It has been found that these properties are retained when the emulsions are applied to leather and the water evaporated therefrom. Coated or impregnated leather when made by this aspect of the invention retains most of its porosity with respect to water vapor but becomes very resistant to the passage of liquid water. In some cases the treated leather will hold a hydrostatic head of 6 feet of water without leaking. It is apparent that leather having these properties is of considerable value in the manufacture of boots and shoes. The products will allow the escape of moisture from the body but at the same time will shed water under all conditions of general use.

It is well known that vinyl polymers such as polyethylene, polyalkyl acrylates, polyvinyl chloride, polyvinylidene chloride, polyvinyl acetate, etc. give films that are very impermeable to water vapor. In fact, such films are usually employed as protective coverings for the purpose of excluding water vapor. Garments and shoes made from materials of this type have a serious disadvantage. Since moisture vapor cannot escape from the body, discomfort is experienced after a short time of wear. Rubber footwear is particularly subject to this problem.

A fabric coated with a rubber-pigment composition capable of transmitting water vapor but not liquid is described in British Patent No. 649,094 referred to above. A similar product is discussed in Textile Research Journal 20, 123–132 (1950) also referred to above; the product obtained has a micro-porous structure that permits the passage of water vapor but the pores are too small to transmit liquid water. The coating is relatively weak and has poor abrasion resistance. Furthermore it is difficult to obtain the correct pore size during the coating process.

The treated leather products of the present aspect of this invention depend upon a new principle. The leather is coated with a synthetic resinous composition in the form of an aqueous emulsion or dispersion comprising an alkyl acrylate polymer and polyvinyl alcohol. The water vapor is transmitted through the polyvinyl alcohol phase. Penetration by liquid water is prevented by the acrylate polymer phase. The coatings show excellent resistance to most organic solvents, including those generally used in cleaning leather products.

The emulsions used in the process of the invention can be advantageously made by the method described hereinabove. Various mixtures of the acrylates can be used, depending upon the type of product desired. Interpolymers of acrylates with other vinyl monomers can also be used as described above.

In order to obtain resistance to organic solvents, it is desirable to cross-link the acrylic ester polymer in addition to the vinyl alcohol constituent of the synthetic resinous composition. The cross-linking of the acrylic ester polymer constituent can be advantageously accomplished during polymerization by adding 0.5 to 5 per cent (higher or lower percentages can also be employed) and preferably 1.0 to 3.0 percent of a divinyl compound such as divinyl benzene, allyl acrylate, allyl phthalate diester, allyl succinate diester, etc. Alternatively, the acrylate polymer constituent can be advantageously cross-linked by adding about 2 to 5 per cent beta-chloroethyl vinyl ether or other equivalent suitable halogen compound to the monomer mixture. Zinc oxide, lead oxide, or equivalent compound can then be added to the final product and cross-linking accomplished by heating.

In order to obtain resistance to swelling by water, the polyvinyl alcohol portion of the film can be advantageously cross-linked by any of the usual agents, e. g., formaldehyde, urea-formaldehyde resins, melamine-formaldehyde resins, oxalic acid, trimethylol nitromethane, ammonium bichromate, etc., as described above.

The ratio by weight of acrylate resin to polyvinyl alcohol constituent can advantageously be from about 80:20 to about 50:50; however, it is most advantageous to employ ratios from about 80:20 to about 65:35.

The emulsions obtained in the polymerization process can advantageously be coated on leather by the usual methods employing rolls and doctor blades. In most cases, it is advantageous to form a resin coating at one surface of the leather. However, it may be desirable in some cases to coat both surfaces and/or to impregnate the entire cross section. From 10 to 50 percent (higher and lower percentages can also be employed) and preferably 20 to 30 per cent of the synthetic resinous compositions described above can be advantageously added to the leather, on a dry weight basis. The coated or impregnated leather is then dried at from about 100–120° C.; however, higher or lower temperatures can also be employed.

Fire-retarding agents such as tricresyl phosphate, triphenyl phosphate, chloroethyl phosphate, etc., can be incorporated in the resinous coating film, if desired.

The following examples will serve to further illustrate this aspect of the invention:

EXAMPLE 10 (COATED LEATHER)

Twenty grams of polyvinyl alcohol was dissolved in 200 cc. of water and the following materials were added: 60.0 grams of methyl acrylate, 1.0 gram of allyl phthalate, 1.0 gram of sodium dodecyl sulfate, and 0.6 gram of potassium persulfate. The mixture was stirred at 50–60° for 8 hours. A viscous, opaque emulsion was obtained. Two grams of trimethylol nitromethane was added as a cross-linking agent for the polyvinyl alcohol constituent. Leather, of the type used for shoe uppers, was coated with the emulsion in sufficient quantity to cause an increase in weight of 20–25 percent, on a dry basis. The coated leather was dried at 110–120° C. Tests made on the finished product showed that it transmitted 60–70 per cent as much water vapor as the uncoated leather. It held a hydrostatic head of 4 to 5 feet of water without seepage. Shoes made from this leather allow moisture to escape from the body, and at the same time, are resistant to penetration by liquid water.

EXAMPLE 11 (COATED TANNED LEATHER)

Twenty grams of polyvinyl alcohol was dissolved in 180 cc. of water and the following materials were added: 30.0 grams of ethyl acrylate, 15.0 grams of vinyl acetate, 1.0 gram of allyl adipate, 0.8 gram of ammonium persulfate and 1.0 gram of sodium octadecyl sulfate. The mixture was stirred at 50–60° for 12 hours. A viscous emulsion formed. Three cc. of 40 percent aqueous formaldehyde solution and 0.2 gram of ammonium chloride were added to the emulsion. Tanned leather, of the type used for hiking boot uppers was coated with the emulsion to give an increase in weight of 15–20 percent, on a dry basis. After drying at 90–100°, the coated leather was heated at 120° for 15 minutes. The treated leather was soft and flexible. It showed a moisture vapor transmission of 70–80 percent of the uncoated material. It held a hydrostatic head of 4 feet of water without seepage.

EXAMPLE 12 (COATED LEATHER)

Twenty grams of polyvinyl alcohol was dissolved in 240 cc. of water and the following materials were added: 60.0 grams of methyl acrylate, 20.0 grams of n-butyl acrylate, 1.5 grams of allyl acrylate, 1.2 grams of sodium persulfate and 1.5 grams of sodium oleyl sulfate. The mixture was stirred at 50–60° for 6 hours to give an opaque, viscous emulsion. One gram of dimethylol urea and 0.2 gram of ammonium chloride were added to the emulsion in order to insolubilize the polyvinyl alcohol. Leather, of the type used for shoe uppers, was coated with the emulsion to give an increase in weight of 35–40 percent. After drying at 100°, it was heated at 110–120° for 10 minutes.

The treated leather showed a water vapor transmission rate of 50–60 percent compared to the uncoated material. It held a hydrostatic head of 5 feet of water without seepage.

We claim:

1. A process as defined in claim 13 wherein the polymerizing is performed in a dispersion of the acrylic ester suspended in an aqueous solution of the polymer having hydroxy radicals containing from about 0.05% to about 3.0% of the water-soluble peroxide polymerization catalyst based on the weight of the acrylic ester.

2. A process as defined in claim 1 wherein the dispersion is facilitated by the presence of an emulsifying agent and agitation.

3. A process for preparing a synthetic resinous composition which resists the passage of liquid water but permits transmission of water vapor comprising (A) polymerizing in an aqueous medium at a temperature of from about 45° C. to about 120° C. in the presence of a water-soluble peroxide polymerization catalyst (a) from about 25 to about 80 parts by weight of an ethylenically unsaturated polymerizable material wherein all carboxy groups are esterified and which consists of at least 50 mole percent of at least one acrylic ester having the formula:

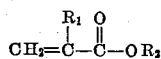

wherein $R_1$ represents a substituent selected from the group consisting of a hydrogen atom and a lower alkyl radical containing from 1 to 4 carbon atoms and $R_2$ represents an alkyl radical containing from 1 to 6 carbon atoms, (b) while in admixture with from about 75 to about 20 parts by weight of a vinyl polymer having hydroxy radicals which can be depicted as follows:

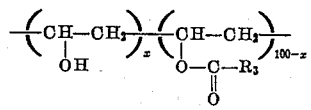

wherein $R_3$ represents a lower alkyl radical, $x$ represents the percentage of this polymer having groups based on vinyl alcohol and $100-x$ represents the percentage based on a lower alkaloic acid ester of vinyl alcohol, the numerical value of $x$ being from about 80 to 100, (B) and adding from about 1 to about 10% (based on the weight of the polyvinyl alcohol content) of a hardening and cross-linking agent for the polyvinyl alcohol content of the resin.

4. A synthetic resinous composition prepared by the process defined by claim 3.

5. A water-base coating composition having the composition defined by claim 4 and a pigment.

6. A process for preparing a synethetic resinous composition which resists the passage of liquid water but permits transmission of water vapor comprising (A) polymerizing in an aqueous medium at a temperature of from about 45° C. to about 120° C. in the presence of a water-soluble peroxide polymerization catalyst (a) from about 25 to about 80 parts by weight of an ethylenically unsaturated polymerizable material wherein all carboxy groups are esterified and which consists of at least 50 mole percent of at least one acrylic ester having the formula:

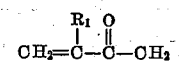

wherein $R_1$ represents a substituent selected from the group consisting of a hydrogen atom and a lower alkyl radical containing from 1 to 4 carbon atoms and $R_2$ represents an alkyl radical containing from 1 to 6 carbon atoms, (b) while in admixture with from about 75 to about 20 parts by weight of a vinyl polymer having hydroxy radicals which can be depicted as follows:

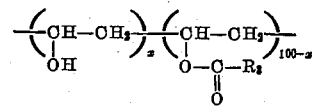

wherein $R_3$ represents a lower alkyl radical, $x$ represents the percentage of this polymer having groups based on vinyl alcohol and $100-x$ represents the percentage based on a lower alkanoic acid ester of vinyl alcohol, the numerical value of $x$ being from about 80 to 100, (B) adding from about 1 to about 10% (based on the weight of the polyvinyl alcohol content) of a hardening and cross-linking agent for the polyvinyl alcohol content of the resin, (C) and evaporating water from the composition.

7. A synthetic resinous composition prepared by the process defined by claim 6.

8. A film having the composition defined by claim 7.

9. A fabric coated with the composition defined by claim 7.

10. Leather coated with the composition defined by claim 7.

11. Fibers having the composition defined by claim 7.

12. A process for preparing a synthetic resinous composition which resists the passage of liquid water but permits transmission of water vapor comprising (A) polymerizing in an aqueous medium at a temperature of from about 45° C. to about 120° C., in the presence of a water-soluble peroxide polymerization catalyst (a) from about 25 to about 80 parts by weight of an ethylenically unsaturated polymerizable material wherein all carboxy groups are esterified and which consists of at least 50 mole percent of at least one acrylic ester having the formula:

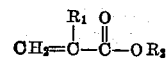

wherein $R_1$ represents a substituent selected from the group consisting of a hydrogen atom and a lower alkyl radical containing from 1 to 4 carbon atoms and $R_2$ represents an alkyl radical containing from 1 to 6 carbon atoms, (b) while in admixture with from about 75 to about 20 parts by weight of a vinyl polymer having hydroxy radicals which can be depicted as follows:

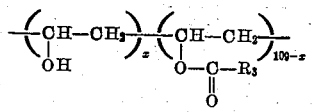

wherein $R_3$ represents a lower alkyl radical, $x$ represents the percentage of this polymer having groups based on vinyl alcohol and $100-x$ represents the percentage based on a lower alkanoic acid ester of vinyl alcohol, the numerical value of $x$ being from about 80 to 100, (c) and while in admixture with from about 0.5 to about 5% (based on the weight of the polyacrylic ester content) of a cross-linking agent for the acrylic ester content of the resin which comprises a compound containing two non-conjugated vinyl groups, and (B) adding from about 1 to about 10% (based on the weight of the polyvinyl alcohol content) of a hardening and cross-linking agent for the polyvinyl alcohol content of the resin, (C) and evaporating water from the composition.

13. A process as defined by claim 12 wherein the ethylenically unsaturated polymerizable material consists of the defined acrylic esters.

References Cited in the file of this patent

UNITED STATES PATENTS

| | | |
|---|---|---|
| 2,047,398 | Voss et al. | July 14, 1936 |
| 2,310,223 | Eaton | Feb. 9, 1943 |
| 2,407,107 | Smith | Sept. 3, 1946 |
| 2,540,962 | Puppolo | Feb. 6, 1951 |
| 2,600,681 | Park et al. | June 17, 1952 |

FOREIGN PATENTS

| | | |
|---|---|---|
| 437,604 | Great Britain | Oct. 28, 1935 |
| 999,594 | France | Oct. 3, 1951 |